United States Patent [19]

Sivaram et al.

[11] Patent Number: 5,288,838
[45] Date of Patent: Feb. 22, 1994

[54] PREPARATION OF POLYCARBONATES WITH BIOXYANION CATALYST

[75] Inventors: Swaminathan Sivaram; Jagdish C. Sehra; Venkat S. Iyer, all of Maharashtra; Ishwar S. Bhardwaj; Sheo Satish, both of Gujarat, all of India

[73] Assignee: Council of Scientific & Industrial Research, New Delhi, India

[21] Appl. No.: 865,951

[22] Filed: Apr. 9, 1992

[51] Int. Cl.$^5$ .............................................. C08G 64/30
[52] U.S. Cl. .................................... 528/199; 528/196; 528/198
[58] Field of Search .................. 528/199, 198, 196

[56] References Cited

U.S. PATENT DOCUMENTS 3,442,854  5/1969  Curtius et al. ..................... 528/199

FOREIGN PATENT DOCUMENTS 1110736  4/1968  United Kingdom .

OTHER PUBLICATIONS

Webster et al. JACS, 105, (1983), 5706.

*Primary Examiner*—Harold D. Anderson
*Attorney, Agent, or Firm*—Abelman Frayne & Schwab

[57] ABSTRACT

The invention discloses an improved process for the preparation of aryl polycarbonates. The process involves reacting aryl carbonate and dihydric phenol in the melt phase with a catalyst belonging to the class of quaternary ammonium bioxyanions having the general formula:

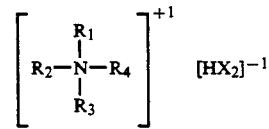

Wherein 'X' represents a carboxylate or a phenolate group or a mixture thereof and 'R' represents alkyl or aryl.

11 Claims, 1 Drawing Sheet

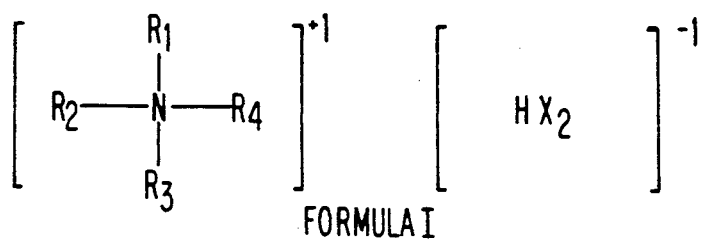
FORMULA I
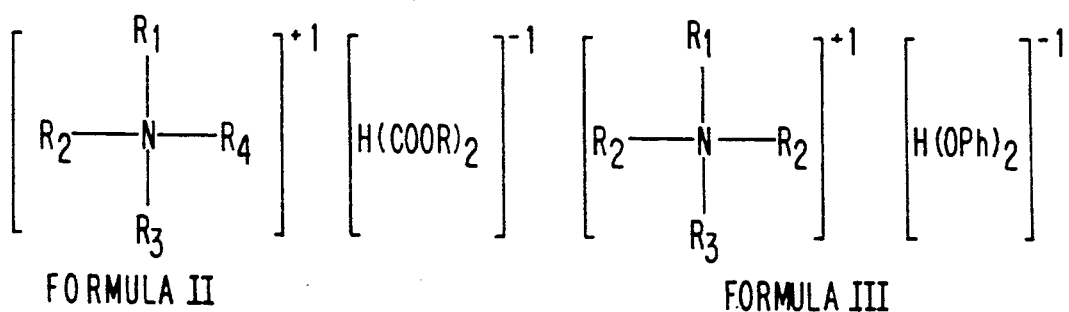
FORMULA II        FORMULA III
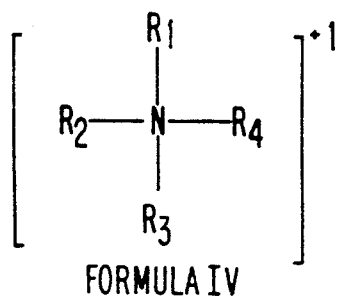
FORMULA IV

PREPARATION OF POLYCARBONATES WITH BIOXYANION CATALYST

BACKGROUND OF TEH INVENTION

This invention relates to an improved process for the preparation of aryl polycarbonates. The present invention particularly relates to the use of bioxyanion type catalysts in transesterification polymerization of diarylcarbonates and dihydric phenol for the production of polyarylcarbonates with improved color and higher thermal stability.

These polyarylcarbonates are the commercial engineering plastics produced by the industry for replacing glass and metals in several areas. Polyarylcarbonate is processed by molding, extrusion and film-forming techniques for conversion of it to different types of useful products.

In the prior art similar compounds have been reported to act as catalysts in 'group transfer' addition polymerization of acrylic monomers. In this context reference may be made to the following literature.
(1) O. W. Webster, W. R. Hertler, D. Y. Sogah, W. B. Farnham and T. V. Rajan Babu, J.Am.Chem.Soc., 1983, 105, 5706.
(2) I. B. Dicker, G. M. Cohen, W. B. Farnham, W. R. Hertler, E. D. Lagann and D. Y. Sogah, Polymer Preprints 1987, 29, 106.

Industry produces polyarylcarbonates by interfacial and transesterification process. In the former, phosgene is condensed with bisphenol-A at an interface of methylene chloride/aqueous sodium hydroxide, under ambient conditions in the presence of catalysts either amine or its salts. The molecular weight of the polymer is controlled by the addition of monohydroxy aromatic compounds. Transesterification consists of melt condensation of diarylcarbonate and dihydric phenol at elevated temperatures in the presence of either basic or acidic catalysts. The molecular weight is regulated by the removal of a byproduct, phenol which is expedited by the application of heat and vacuum treatments. Basic catalysts such as alcoholates, phenolates and carboxylates of alkali metals are cited as useful catalysts for transesterifications. Reference may be made to British Patent 1,110,736 on the transesterification process.

There are inherent limitations in both the processes. The isolation of interfacial product, polyarylcarbonate from the reaction mixture, needs washings for the removal of byproduct and catalyst, recovery of solvent for recirculation and densification of product prior to fabrications. The transesterification reaction obviates these drawbacks associated with the interfacial process. But the high melt viscosity of the prepolymer causes problems in its further transesterifications towards the synthesis of high molecular weight polymer. By utilising specialised equipment designed to generate high surface for overcoming high melt viscosity limitations for condensations, the polymer of desired molecular weight is achieved by appropriate heat and vacuum treatments. Most of the alkaline metal based catalyst used in the prior art for transesterifications induce discoloration of the products, due to the high temperatures involved. Also the catalysts contain metals which are left as residues in the polymer.

The main object of the present invention is to provide an improved process for the preparation of polycarbonates using quaternary ammonium bioxyanions as metal free catalysts for the melt transesterification-polycondensation of diarylcarbonates and dihydric phenols.

SUMMARY OF THE INVENTION

Accordingly the present invention provides an improved process for the preparation of aryl polycarbonates which comprises reacting aryl carbonate and dihydric phenol in the melt phase with a catalyst belonging to the class of quaternary ammonium bioxyanions having the general formula I of the drawing accompanying this specification, wherein X represents a carboxylate or a phenolate group or a mixture thereof and R represents alkyl or aryl.

BRIEF DESCRIPTION OF THE DRAWINGS

The invention will be further explained with reference to the accompanying drawing. In the drawing, Formulas I, II, III and IV are illustrated. They are discussed in greater detail hereafter.

DETAILED DESCRIPTION OF THE INVENTION

Quaternary ammonium bioxyanion's preparation consists of reacting in a separate step one mole of quaternary ammonium hydroxide with two moles of organic oxyacids to form discrete bioxyanion species either as solids or as semisolids. Suitable organic oxyacids are aliphatic and aromatic carboxylic acids and phenols with or without substituents in the aromatic ring. To elaborate further the art of bioxyanion in terms of the overall 2:1 molar ratio of oxyacid to ammonium hydroxide, it may be emphasized that the initial stage involves the neutralization of one mole of oxyacid with one mole of quaternary ammonium hydroxide, and then the treatment of the resulting quaternary ammonium salt with another mole of oxyacid leads to the formation of bioxyanion. Quaternary ammonium bioxyanions with carboxylate and phenolate groups are shown in formula II and III of the drawing accompanying this specification wherein X in formula I is either a carboxylate or a phenolate group or a mixture thereof and R represents alkyl or aryl. It is evident that several bioxyanions can be formulated by variation of R's in the bioxyanion and cation. Since the bioxyanion is the active species of the catalyst, therefore treatment of bioxyanions precedes that of the cation.

It is quite clear that a combination of two oxy anions having the total negative charge of 2 with a proton of a unit positive charge leads to a composite bioxyanion of negative charge unity.

The catalysts derived from aryl groups are dealt here, however, the art does not exclude the scope of alkyl carboxylate based bioxyanion catalysts either. Aromatic compounds with more than one carboxylic acid groups can yield correspondingly several bioxyanion species in the same catalyst. For example, two carboxylic acid groups in the terephthalic acid will produce two bioxyanions in the same aromatic ring. Thus, the number of bioxyanions in a given compound is related to the number of carboxylic acid in that compound. Aromatic carboxylate bioxyanions may comprise of either same or different groups. Mainly the species with same type of groups are considered here. By the introduction of nuclear substituents in the aromatic ring, the scope of catalysis further increases. [I. B. Decker, G. M. Cohen, W. B. Farnham, W. R. Hertler, E. D. Lagann, and D. Y. Sogah; Polymer Preprints, 1987, 29, 106]. Substituents in the aromatic ring include nitro, halo, sulfanoto, alkoxy etc. Few of the documented catalysts include tetrabutyl ammonium bibenzoate, tetrabutyl ammonium bis-3-chlorobenzoate, tetrabutyl ammonium bis-4-nitrobenzoate and tetrabutyl ammonium bis-4-cyanobenzoate.

Bioxyanions, phenolates can be prepared in a similar manner as those for carboxylates. Aromatic compounds with more than one hydroxy group can form catalysts having more bioxyanions in the same catalyst. Also nuclear substituted biphenolate are prepared by the method described above. Few biphenolates can be, tetrabutyl ammonium biphenolate, tetrabutyl ammonium bi-4-chlorophenolate and tetrabutyl ammonium bi-4-nitrophenolate. Many other such quaternary ammonium biphenolate may behave as potential catalysts.

Quaternary ammonium component of the catalyst also exerts influence on the overall activity of the catalyst. Quaternary ammonium cation is equipped with four organic groups as shown in formula IV of the drawing accompanying this specification, which can be alkyl or aryl. Quaternary ammonium cation may have either same or different groups. For example, in tetrabutyl ammonium hydroxide all the groups are similar, whereas in trimethyl phenyl ammonium hydroxide, phenyl is the only different group. Bioxyanions, containing alkyl substituted quaternary ammonium cations are employed as catalyst components, however the scope of the art may cover other types of organic groups in the cation as well. Accordingly, the present invention provides an improved process for the preparation of polyarylcarbonates which comprises reacting arylcarbonate and dihydric phenol in the melt phase with a catalyst belonging to the class of quaternary ammonium bioxyanions having the general formula 1 shown in the drawing accompanying this specification.

The dihydric phenols employed may be bisphenol A, halo-substituted bisphenol A, alkyl substituted bisphenol A, hydroquinone, resorcinol and various types of other polyphenols.

Suitable aryl carbonates may be diphenyl carbonate, bis(o-halophenyl) carbonate and bis(o-nitrophenyl) carbonate.

The catalysts employed may be preferably, tetrabutyl ammonium bibenzoate, tetrabutyl ammonium bi-3-chlorobenzoate, tetrabutyl ammonium bi-4-nitrobenzoate, tetrabutyl ammonium biphenolate, tetrabutyl ammonium bi-4-nitrophenolate.

The amount of catalyst employed may be quite low and it ranges from $10^{-3}$–$10^{-7}$ mole with reference to one mole of dihydric phenol. The concentration may be between $10^{-3}$–$10^{-5}$ mole catalyst per mole dihydric phenol.

The polymerization reaction may be conducted at different pressures ranging from atmospheric pressure to sub-atmospheric pressure. Generally 1 atm ($\sim$,760 mm Hg) is maintained during the initial phase and subsequently the pressure is reduced to a value in the order of 1.0 to 0.1 mm Hg vacuum or even lower.

The temperatures of reaction may range from 100° to 300° C. or higher. Often temperature profile of 120°–280° C. is ideal for smooth running of the polymerization reaction. Reaction time may be varied from 1 hour to 20 hours, preferably between 4–10 hours range.

The polymers formed are colorfree which indicates that side reaction products are not a dominant feature of the process. Also the polymer produced do not have metallic residues. Further the transesterified end-products derived from the process exhibit intrinsic viscosities equal to or greater than 0.4 dl/g or higher as measured chloroform at 25° C. The relative viscosity corresponding to the intrinsic viscosity of 0.4 dl/g is 1.25. The molecular weight of the polymer ranges from 20000 to 30000.

The main advantages of the invention are:

Unlike hitherto known catalysts used for the preparation of arylpolycarbonates, the quaternary ammonium bioxyanions are not affected by moisture. Synthesis of quaternary ammonium bioxyanion catalyst by a simple procedure is an important advantage of the overall process. Moreover, these catalysts maintain high activity at elevated temperatures of polymerization. The stability of the catalysts to moisture and their neutral nature minimizes unwanted degradations at high temperatures leading to products with superior color. The catalyst is metal free and does not leave metallic residues in the polymer. This results in higher thermal stability of polymers prepared using bioxyanion catalysts.

The invention is illustrated by the examples given below which should not be construed to limit the scope of the invention.

EXAMPLE 1

0.20 mol bisphenol A, 0.21 mol diphenyl carbonate, $3\times10^{-6}$ mol tetrabutyl ammonium bibenzoate and $4\times10^{-3}$ mol phenyl benzoate are taken in a 250 ml glass reactor equipped with stirrer, nitrogen inlet and distillation assembly. Under the blanket of nitrogen the contents in the reactor were heated by means of thermostatically controlled furnace to 160° C. for 1½ hr. Subsequently, the temperature was increased to 230° C. and pressure reduced from atmospheric to 100 mm Hg, and on keeping constant the temperature and pressure for one hour, about 80% phenol was collected. Maintaining the temperature at 230° C., the pressure was decreased sequentially in a following way: 80 mm, ½ hour; 60 mm, ½ hour; 40 mm, ½ hour; 20 mm, ½ hour; 10 mm, ½ hour and 1 mm, ½ hour. It was then observed that phenol removal was almost quantitative. Finally reaction mixture was heated to 280° C. at 1 mm for one hour to remove any residual phenol. The polymer, bisphenol A polycarbonate obtained in 99% yield was colorfree and its relative viscosity measured in chloroform at 25° C. in an ubbelohde viscometer was 1.26.

EXAMPLE 2

0.25 mol bisphenol A, 0.27 mol diphenyl carbonate $3.5\times10^{-6}$ mol tetrabutyl ammonium bis-4-nitrobenzoate, $6\times10^{-3}$ mol phenyl benzoate were added to the glass reactor flushed with nitrogen at room temperature. The temperature was increased to 140° C. in 1½ hour duration. Later the pressure was reduced from atmosphere to 110 mm Hg and temperature increased to 240° C., and on maintenance of these conditions for 1 hour, about 85% phenol was collected. Subsequently, the temperature was increased to 270° C. and pressure reduced to 10 mm and under these conditions most of the phenol was collected in 2 hours. Finally, the reaction mixture was kept at 285° C. and 1 mm for 1 hour to remove traces of phenol. The polymer, bisphenol A polycarbonate obtained in 99% yield was white in color and its relative viscosity was 1.32.

EXAMPLE 3

On replacing the catalyst with tetrabutyl ammonium bis-2-nitrobenzoate, the polycondensations of diphenyl carbonate and bisphenol A were carried out under conditions identical to those described for example 2. The colorfree polymer, bisphenol A polycarbonate formed in 98.5% yields had a relative viscosity of 1.28.

EXAMPLE 4

0.15 mol bisphenol A, 0.16 mol diphenyl carbonate $2 \times 10^{-6}$ mol tetrabutyl ammonium bis-4-nitrophenolate, $3 \times 10^{-3}$ mol phenyl benzoate were placed in a reactor which was blanketted with nitrogen. Temperature was raised from ambient to 150° C. during one hour while the reactor contents were maintained at atmospheric pressure. Then changing the temperature to 240° C. and pressure to 90 mm Hg in 1½ hours, phenol removed from the reactor was nearly 75%. On subsequent increase in temperature to 260° C. and decrease in pressure to 20 mm Hg, phenol collected in 2 hours was 99%. In the end the reaction mixture was heated to 280° C. at 1 mm Hg for 1 hour. The colorfree polymer, bisphenol A polycarbonate in 99% yield obtained had a relative viscosity 1.24.

It is borne out from examples that the catalyst quaternary ammonium bioxyanion discovered, are quite efficient for the transesterification of diarylcarbonate and dihydric phenols. Polyaryl carbonates are almost colorfree. The relative polymer viscosities in 1.25 to 1.32 range are suitable for injection molding purposes. With more investigations on transesterification by these catalysts, the scope of innovations may further be broadened.

We claim:

1. An improved process for the preparation of aryl polycarbonates which comprises reacting an arylcarbonate and a dihydric phenol in the melt phase with a catalyst belonging to the class of quaternary ammonium bioxyanions having the general formula:

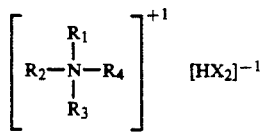

wherein X represents a carboxylate and R represents alkyl or aryl.

2. An improved process as claimed in claim 1 wherein the dihydric phenol is selected from the group consisting of bisphenol A, hydroquinone, resorcinol, halo-substituted bisphenol A, and alkyl substituted bisphenol A.

3. An improved process as claimed in claim 1 wherein the arylcarbonate is selected from the group consisting of diphenyl carbonate, bis(o-halophenyl) carbonate, and bis(o-nitrophenyl) carbonate.

4. An improved process as claimed in claim 1 wherein the amount of catalyst ranges from $10^{-3}$–$10^{-7}$ mole with reference to one mole of dihydric phenol.

5. An improved process as claimed in claim 1 wherein the reacting is effected at a pressure ranging from atmospheric to sub atmospheric pressure.

6. An improved process as claimed in claim 1 wherein initially 1 atm pressure is maintained and subsequently reduced to 1.0 to 0.1 mm Hg vacuum or even lower.

7. An improved process as claimed in claim 1 wherein the reacting is effected at a temperature in the range of 100° C.–300° C. or higher.

8. An improved process as claimed in claim 1 wherein the reacting is effected for a period of 1 to 20 hours.

9. An improved process as claimed in claim 7 wherein the reacting is effected at a temperature between 120° C.–280° C.

10. An improved process as claimed in claim 8 wherein the reacting is effected for a period of 4–10 hours.

11. An improved process for the preparation of aryl polycarbonates which comprises reacting an aryl carbonate and a dihydric phenol in the melt phase with a catalyst selected form the group consisting of tetrabutyl ammonium benzoate, tetrabutyl ammonium bi-3-chlorobenzoate, tetrabutyl ammonium bi-4-nitrobenozate and tetrabutyl ammonium bi-4-nitro-phenolate.

* * * * *